(12) United States Patent
Naik et al.

(10) Patent No.: US 8,219,026 B2
(45) Date of Patent: Jul. 10, 2012

(54) DYNAMICALLY VARYING LINK SUPER VISION TIMEOUT IN BLUETOOTH AND SIMILARLY ENABLED DEVICES TO DETECT LINK LOSS

(75) Inventors: Sachin D. Naik, Bangalore (IN); Santosh Prabhu, Bangalore (IN); Muralidhar Rajan, Bangalore (IN)

(73) Assignee: KYOCERA Corporation, Kyoto (JP)

( * ) Notice: Subject to any disclaimer, the term of this patent is extended or adjusted under 35 U.S.C. 154(b) by 1106 days.

(21) Appl. No.: 12/103,359

(22) Filed: Apr. 15, 2008

(65) Prior Publication Data
US 2009/0258596 A1  Oct. 15, 2009

(51) Int. Cl.
*H04B 7/00* (2006.01)

(52) U.S. Cl. ........................ 455/41.2; 370/311

(58) Field of Classification Search ............... 455/41.2, 455/575.2, 575.9, 575.6, 550.1, 515, 517, 455/67.11, 574, 73; 370/311, 310, 350; 379/430, 379/428.02
See application file for complete search history.

(56) References Cited

U.S. PATENT DOCUMENTS

| | | | |
|---|---|---|---|
| 7,043,205 B1 | 5/2006 | Caddes et al. | |
| 7,242,677 B2 | 7/2007 | Hong | |
| 7,653,017 B2 * | 1/2010 | Huylebroeck | 370/311 |
| 2003/0207683 A1 | 11/2003 | Lempio et al. | |
| 2004/0152417 A1 | 8/2004 | Kim | |
| 2005/0143046 A1 | 6/2005 | Suzuki | |
| 2005/0287949 A1 | 12/2005 | Harris et al. | |
| 2006/0154605 A1 | 7/2006 | Ham | |
| 2007/0173270 A1 * | 7/2007 | Block et al. | 455/507 |
| 2007/0177567 A1 | 8/2007 | Parys | |

FOREIGN PATENT DOCUMENTS

| | | |
|---|---|---|
| WO | WO 01/67799 | 9/2001 |
| WO | WO 03/069934 | 8/2003 |

OTHER PUBLICATIONS

Bluetooth SIG, "Specification of the Bluetooth System, Version 2.1 + EDR", Jul. 26, 2007 (retrieved from the internet: http://www.bluetooth.com/NR/rdonlyres/F8E8276A-3898-4EC6-B7DA-E5535258B056/6545/Core_V21_EDR.zip).
Bluetooth SIG, "Hands-free profile 1.5", Nov. 25, 2005 (retrieved from the internet: http://www.bluetooth.com/NR/rdonlyres/C0F90A55-BDE4-4FB3-A4FF-DAB0F137DBDF/1762/HFP15_SPEC_V10r00.pdf).
Jean Tourrilhes, "On-Demand Bluetooth: Experience Integrating Bluetooth In Connection Diversity", Aug. 20, 2003, Hewlett Packard Laboratories (retrieved from the internet: http://www.hpl.hp.com/personal/Jean_Tourrilhes/Papers/BT.Demand.pdf).

* cited by examiner

*Primary Examiner* — Nay A Maung
*Assistant Examiner* — Angelica Perez

(57) ABSTRACT

The present example provides for modification of the link supervision timer allows for an enhanced user experience with wireless devices, by allowing loss of the wireless link to be handled more effectively. The link supervision timer may be changed without modifying the device profile being used. The change in the timer may be based upon the profile of the communications that is occurring, and upon the current state of the communications.

16 Claims, 5 Drawing Sheets

DYNAMICALLY VARYING LINK SUPER VISION TIMEOUT IN BLUETOOTH AND SIMILARLY ENABLED DEVICES TO DETECT LINK LOSS

FIELD OF THE INVENTION

This description relates generally to networks and more specifically to the establishment and maintenance of a wireless network connection.

BACKGROUND

Low power wireless networks may be employed as a cable replacement in various applications. Cellular telephones and computers may often make use of wireless networks where cables may be undesired or unavailable. Because of their low power the networks may be replicated, typically without interfering with each other.

In an effort to aid interoperability, manufacturers may produce devices that operate or conform to one or more standards that may or may not be backwards compatible. Standards can be proposed by individual companies, or by groups of companies typically seeking to advance items of common interest such as the replacement of cables with a wireless link. Bluetooth is one such standard.

The Bluetooth standard describes a wireless cable replacement system that may be used with many types of devices that transmit data ranging from digital data to audio. However, in implementing a standard that is wide ranging, tradeoffs may be made so that the best performance may not necessarily be obtained for any one situation. If the standard were to give the best performance for one application, performance in another may not be acceptable.

A device may be built to conform completely to a standard, or it may partially conform. Also, even though a standard may serve as a basis to provide interoperability the device may have its own unique design and features that work with and according to the standard, as the standard may often be thought of more of as an outline of operation, with details being left to the designer.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides for modification of the link supervision timer and allows for an enhanced user experience with wireless devices, by allowing loss of the wireless link to be handled more effectively. The link supervision timer may be changed without modifying the device profile being used. The change in the timer may be based upon the profile of the communication that is occurring, and upon the current state of the communication.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
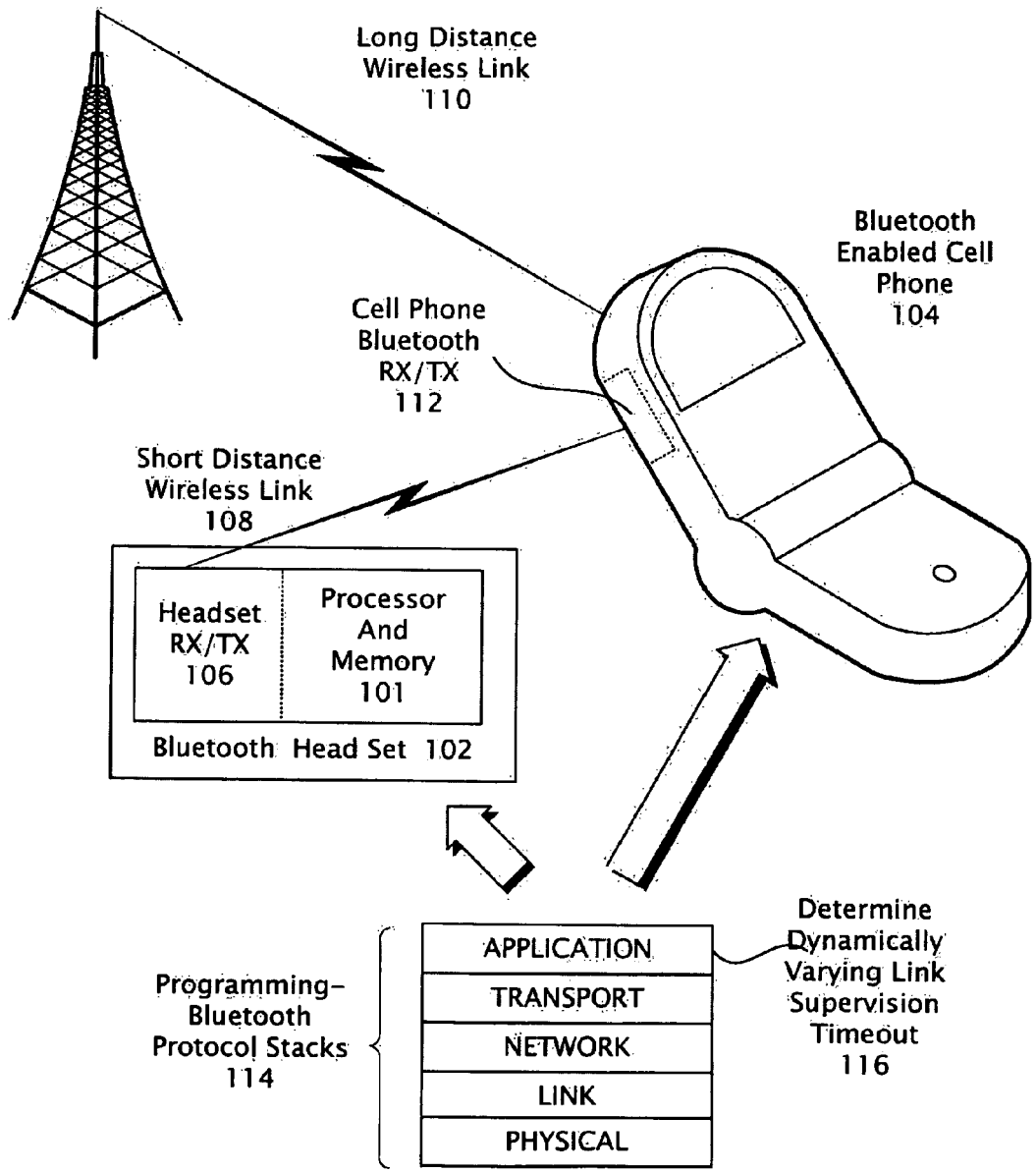
FIG. 1 shows an exemplary Bluetooth enabled cell phone and Bluetooth headset/hands-free device having a dynamically varying link supervision timeout.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In establishing a connection between one or more devices there may be a series of steps, or handshakes for discovering and connection to another device. Also since the devices are frequently mobile, or portable, a way of determining if the other device is still within range, or still receptive to communication may be employed. However, if there is a time lag in determining if the link is still present as compared to the time when the link was broken, information may be lost, there may be a gap in the conversation, or other unpleasant user experiences may be encountered while one device still attempts to transmit or receive from a device that is no longer connected.

Bluetooth being a wireless technology there is a possibility that either the Master unit such as an exemplary cell phone, or the Slave unit such as an exemplary car kit, may be moving out of range of each other or either one of them may be powering down abruptly. When this happens the wireless link between them breaks down and communication is typically no longer possible. To detect such a link loss, the Bluetooth specification defines a timer called as "Link Supervision Timer", run both by the Master and the Slave.

Master or Slave can start this timer when it expects a response from other end. And on receiving the response this timer is reset. If this timer expires in either the Master or the Slave it is understood that the physical link between them is lost.

The link supervision timer is typically the only way for a device, using Bluetooth as a communication medium, to find out if the other device involved in communication is still in communication range.

The examples below describe a dynamically varying link supervision timer. Although the present examples are described and illustrated herein as being implemented in a Bluetooth hands free system, the system described is provided as an example and not a limitation. As those skilled in the art will appreciate, the present examples are suitable for application in a variety of different types of communications standards (Bluetooth and the like) and differing systems (headset, and the like) provided for by the standard.

Bluetooth is a communications standard governed and developed by the Bluetooth Special Interest Group ("SIG"). Bluetooth is a standard that may be defined by various versions that are typically backward compatible. The current Blue tooth standard, Bluetooth v2.1, and any following Bluetooth standards that might be issued are contemplated to operate satisfactorily with the examples described below. Bluetooth when used below will be understood as referring to any of the Bluetooth standards issues, or about to issue, and other equivalent standards (Wibree, ZigBee and the like) issued by other standards bodies such as IEEE and the like. For example, equivalently IEEE Standard 802.15.1-2002 (based on the Bluetooth v1.1 specification), and other IEEE specifications such as those based on Bluetooth v1.2 and other Bluetooth standards may equivalents operate with the examples described herein.

Bluetooth is a standard that describes a cable replacement wireless communications that may be used with low power consumption, a short range (typically: 1 meter, 10 meters, 100 meters depending upon power) transceiver microchips disposed in each device connection may be made to. A group of Bluetooth devices may operate in synchronization to a common clock and frequency hopping pattern to form a piconet. In operation, a physical radio channel may be shared by one or more devices that may be synchronized to a common clock and frequency hopping pattern. The master device is the one device in the group that provides a synchronization reference. All other devices are known as slaves. In Bluetooth, information is transmitted in packets that may be assigned to a time slot in transmission. In addition frequency hopping may be used in transmitting and receiving the packets.

To join a Bluetooth piconet, a device typically must be compatible and share with the devices one or more Bluetooth profiles. Profiles typically provide additional information to define and implement desired Bluetooth applications. Examples of applications may include the communications between a mobile (or cellular) telephone and a hands free headset; a wireless network link for networking computers; replacement of PC bus component connections between computers, mice, and keyboards; dialing a mobile phone through a Bluetooth link established with a personal digital assistant ("PDA"); providing a link between a wireless controller and a video game; and other applications. The link is a radio frequency link, so the devices in communication with each other need not be in line of sight with each other. However, the devices should be within range of each other to operate properly. If the devices exceed their permissible operating range their connection may degrade or be canceled. And as a result data and other information may be lost. For example when devices are communicating and one of them goes out of range, one of the devices could be waiting for a reply that never reaches it, or data could be sent nowhere, as the device that the data is being sent to is no longer in range.

The Bluetooth specification provides a timer to determine if a device is within range. If a response is not received within a predetermined window of time, then the connection is deemed to no longer be present. However until the timer expires information such as a conversation or data being sent may continue to be transmitted without realizing that the receiving party or device is not there. In the case of a conversation this may create an unpleasant user experience for the parties engaged in a conversation.

Timers may typically be specified in a Bluetooth device's profile. Profiles are preloaded software instructions that allow Bluetooth devices to dispense with the need to load software programs called drivers to enable the devices to communicate. The information needed to establish communications between particular devices is provided in the profile. However, a fixed timer may lead to undesirable user experiences in using a Bluetooth device. The examples described below describe an example of a dynamically varying link supervision timer.

FIG. 1 shows an exemplary Bluetooth enabled cell phone and Bluetooth headset/hands-free device having a dynamically varying link supervision timeout. A cell phone 104 may receive signals via a conventional long distance cellular signal 110. A cell phone 104 (or other equivalent device) may also typically be enabled so that the audio signals that would typically be transmitted and received from microphone and speaker respectively are transferred via wireless link 108 to a headset, or hands free device 102.

To utilize Bluetooth technology a cell phone 104 may typically include a Bluetooth capable transceiver ("RX/TX") 112. A headset, or hands free device 102 may include a similarly configured headset transceiver 106. The transceivers typically operate in conjunction with a processor and memory 101, and other associated circuitry to control the link transmissions 108 as controlled by the Bluetooth protocol stack 114.

To implement this audio transfer or other similar cable replacement technique a standard such as Bluetooth that governs the wireless link 108 may be utilized. To implement Bluetooth (or another equivalent standard's) interoperability, a programming protocol stack 114 may be implemented in the phone 104, and the car kit, or headset 102. In particular the link supervision timeout that is part of the Bluetooth protocol stack 114 may be modified. A separate application program or a portion of another application program may monitor the stack 114 and determine and implement a dynamic modification of the link supervision timer 116.

Devices incorporating hands free communication may use Bluetooth as its wireless technology. A hands free device such as a mobile phone or other device incorporating Bluetooth technology would typically require the mobile phone to make or initiate the call. However, the Bluetooth technology acts as a cable replacement technology allowing wires from the cell phone to be eliminated. Hands free devices capable of communicating with the exemplary mobile telephone may include Bluetooth headsets, hands-free car kits ("HFCK"), personal navigation devices (PND), PDAs and the like. Devices previously providing these functions were typically connected by a wire to mobile phones or other communication devices, but are now typically are available with wireless Bluetooth cable replacement technology.

Bluetooth hands free options may be provided in automotive applications as part of the vehicle's stereo system, in after market stereo system units, hands free car kits and the like, Bluetooth hands free options may utilize a vehicle's speakers to transmit the caller's voice in the phone call and may have an embedded microphone in the stereo unit itself, the steering wheel, or a separate microphone that can be placed anywhere in the vehicle.

Bluetooth capable devices typically utilize Bluetooth profiles in their operation. A Bluetooth profile is typically a wireless interface specification to coordinate Bluetooth communications between devices. In order to use Bluetooth technology, a device typically must be compatible with a particular Bluetooth profile or profiles. In short the particular way a device utilizes Bluetooth technology depends upon its profile. Profiles also act as specifics of the standard so that a manufacturer can produce Bluetooth devices that behave in a uniform and interoperable manner. The various profiles may have common features such as suggested user interface formats, dependencies on other profiles, and definition of parts of the Bluetooth protocol stack used by the profile (To perform its task, each profile can use particular options and parameters at each layer of the stack, which may include an outline of the required service record).

To operate as a Bluetooth device, each profile uses particular options and parameters at each layer of the stack. For example the hands free profile ("HFP") describes how a gateway device can be used to place and receive calls for a hands-free device.

Bluetooth may utilize a close cooperation of hardware and software to implement its functions. In networking the convention of layers may be utilized to define the operation of various combinations of subsystems and sub-programming. The physical layer typically refers to the hardware and the software to control the actual transmission of information. Above the physical channel there may be layering of links and channels with associated control protocols. From the physical channel upwards the order of links and channels may be the: physical channel, physical link, logical transport, logical link and L2CAP channel.

Figure 2:
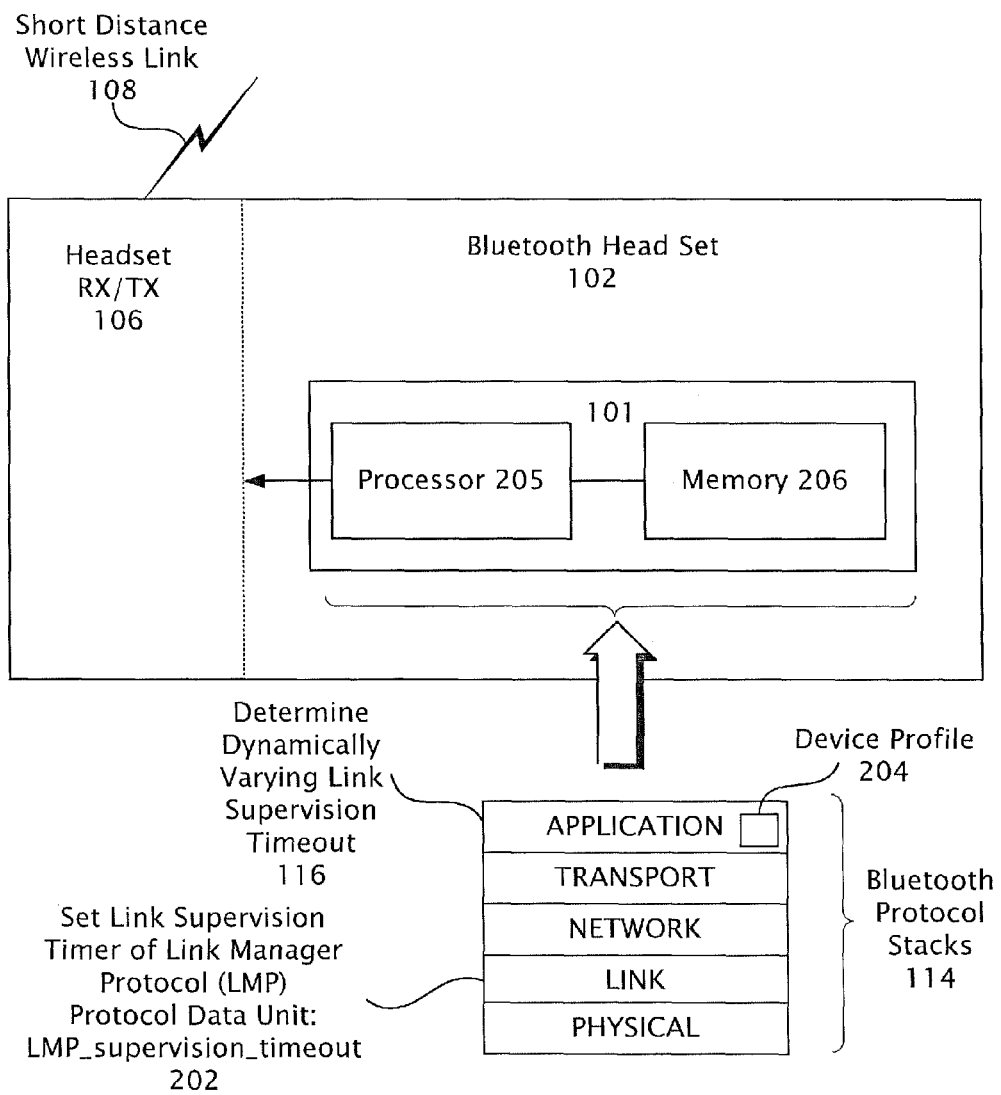
FIG. 2 shows a block diagram of an exemplary system for implementing the dynamically varying link supervision timeout.

FIG. 2 shows a block diagram of an exemplary system for implementing the dynamically varying link supervision timeout 116. The link supervision timer may be changed depending on use, irrespective of the Bluetooth profile 204 being used. For example if the hands free profile is in use, and the user is engaged in a call, the link supervision timer 202 may be reduced as determined by a Bluetooth or other standard independent method 116. Similarly, , for the example of a PAN profile, if the network (TCP/IP) link is slow (i.e. slower than a nominal value), the link supervision timeout may be increased accordingly. By varying the link supervision timer the user experience may be enhanced by detecting the link loss at an appropriate time. That is, the link supervision timer, which may be considered an RF link disconnection timer, delays indication of disconnect by devices such as a cell phone, until the timer expires. This delay in receiving an indication of disconnect can result in a bad user experience. The link supervision is implemented according to the Bluetooth specification, and is independent of the profile. However, the dynamic variation of the link supervision may be done locally without having to modify the Bluetooth specification.

As shown the Bluetooth protocol stack 114 may include a number of layers, such as an application layer and a link layer. In the application layer the device profile 204 may be stored and processed. The various processes occurring in the device 102 and in particular in other layers may be utilized to determine the dynamically varying link supervision timeout 116 which may be used to vary or override the link supervision timeout 202. For example, the link supervision timer may be shortened (i.e. the timeout setting may be reduced) when an audio signal is being processed in one or other layers. In another example, the link supervision timer may be left at the predetermined setting if no audio signal is being processed.

As previously noted the Bluetooth protocol stack 114 may be implemented in a processor 205 and a memory 206, to control a transceiver 106. Operations occurring higher in the stack 114 such as the application layer may be processed substantially in the processing block 101. Operations lower in the stack that may be more hardware controlled, and link management oriented such as represented by the physical layer and the link layer may be substantially implemented by hardware such as the transceiver 106.

Figure 3:
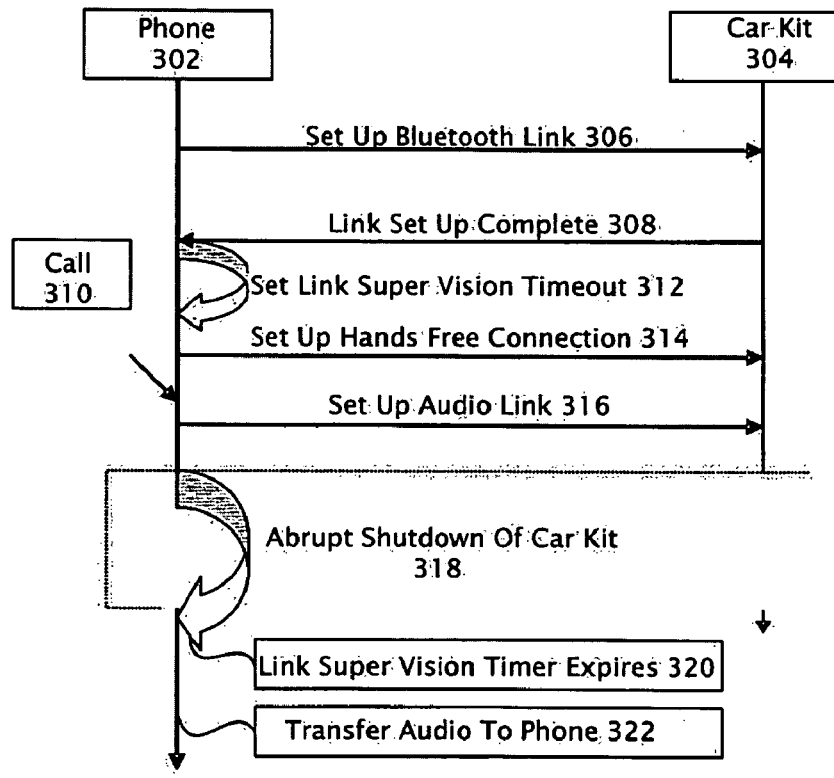
FIG. 3 shows a conventional connection scenario showing a conventional static link timer.

FIG. 3 shows a conventional connection scenario showing a conventional static link timer. In the connected state Bluetooth may offer many profiles to the user with varying degree of time criticality that may affect user experience. As an example, data exchanged between the Audio Gateway ("AG") (such as a cellular telephone, PC, or the like) and Hands Free ("HF") (such as a head set, car kit or the like) may be more real time sensitive than data exchanged between a Personal Area Network ("PAN") client and the PAN server, in case of Personal Area networking. Each of these applications may include a profile such as with the AG/HF application and the PAN application, with the AG/HF profile typically being more sensitive to time lags.

But when it comes to link disconnection, this sensitivity to the application is typically not allowed for. The "Link Supervision Timer" value doesn't change on a per profile basis but remains the same for all profiles. This could result in bad user experience especially when considering profiles involved in real time data exchange. For example, a user who is on a call using cell phone 104, and using a hands free device, such as head set 102, may believe a conversation is ongoing when, in fact, the radio frequency link 108 is lost. However, the link supervision timer 202 has not yet timed out. In this situation, the user will not have an indication that a disconnect has occurred and could, for example, continue talking into the headset 102, even though there is no physical connection between the headset 102 and the cell phone 104. Therefore, the embodiments provide the advantage of dynamically adjusting the link supervision timer to a setting different than the predetermined setting, taking into account the profile and the state of the profile (for example, an audio signal being processed as discussed above).

In establishing a connection between a phone 302 and a car kit 304, the phone first seeks to establish the Bluetooth link 306. In response the car kit 304 sends notification to the phone 302 that the link set up is complete 308. After the link set up is complete, the link supervision timeout is set in the phone 302 as shown in 312. The phone 302 then sets up the hands free connection 314, and next sets up the audio link 316.

At this point the phone 302 could go out of range of the car kit 304 which may alternatively be a headset. If the phone 302 does go out of range of the car kit 304, the timer in the car kit 304 and phone 302 are looking for a signal. Either the car kit 304 or phone 302 may be sending audio packets that will not be received by the phone 302, or car kit 304, respectively. Sending audio packets, that are not receivable, may continue until the link supervision time out expires 320, at which point the car kit 304 may be abruptly shut down 318. At this point the audio signals are no longer sent to the car kit 304, but are transferred back to the phone 302, as shown in 322.

As shown on abrupt shutdown of the car kit audio is neither heard on the car kit nor on the phone. This happens as the phone is not aware of the link status and it keeps sending the audio packets over the Bluetooth link and till expiry of the link supervision timer. If the link supervision supervision timer setting is high, the duration till which audio is not heard also increases.

Figure 4:
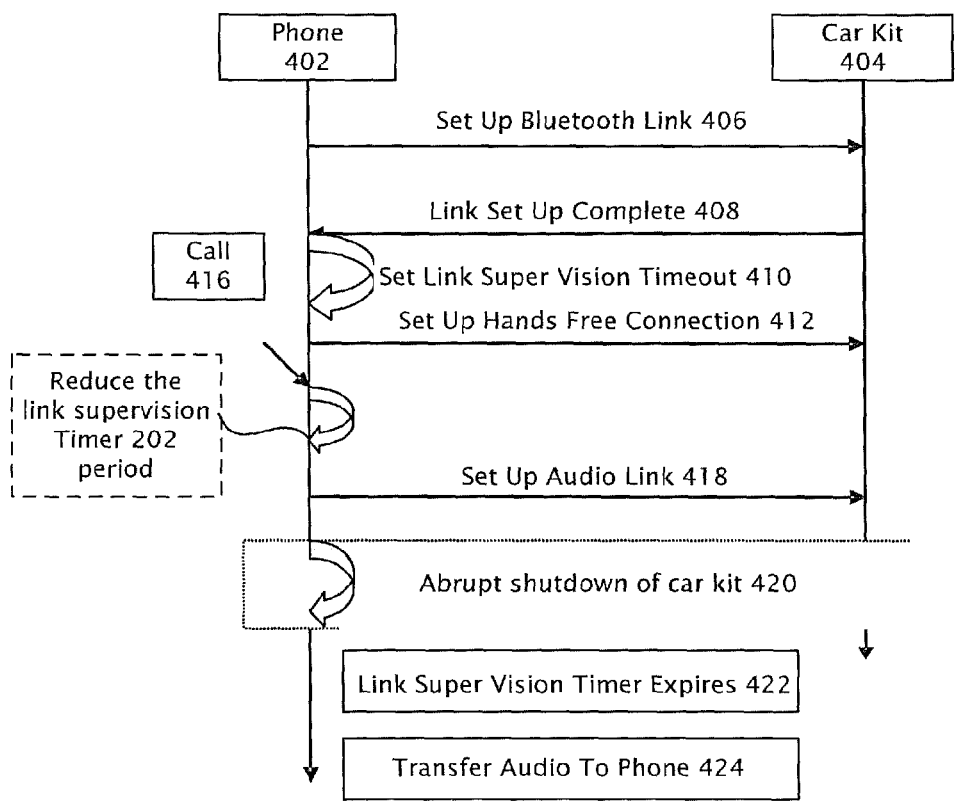
FIG. 4 shows a special connection scenario showing the operation of a dynamically varying link supervision timeout.

FIG. 4 shows a special connection scenario showing the operation of a dynamically varying link supervision timeout. A way of minimizing voice and data loss would be to decrease the link supervision time out. However if link supervision timeout is decreased drastically even a small interference in signals between the phone and car kit could trigger a disconnect.

Dynamic configuration of the "Link Supervision Timer" taking into consideration the profile being used as well as the state the profile is in, may provide a better user experience. For the example of the Hands Free Profile by going through some of the states that the HF and the Audio Gateway ("AG") could be it may be possible to arrive at a modified value of the "Link Supervision Timer".

In the idle state the Phone and Car Kit may be connected but not in a call. In the idle state, the "Link Supervision Timer" could remain set to its default value, for example 20 seconds. In idle state there is typically not much adverse impact on user experience by the "Link Supervision Timer". Also having the link supervision timer set to a higher value can give more time for the HF and AG to recover and still retain the link. In the in call state the Phone and Car Kit may be connected with Phone in a call. In this state, the "Link Supervision Timer" value may be reduced to a substantially smaller value, say 2 seconds.

Figure 5:
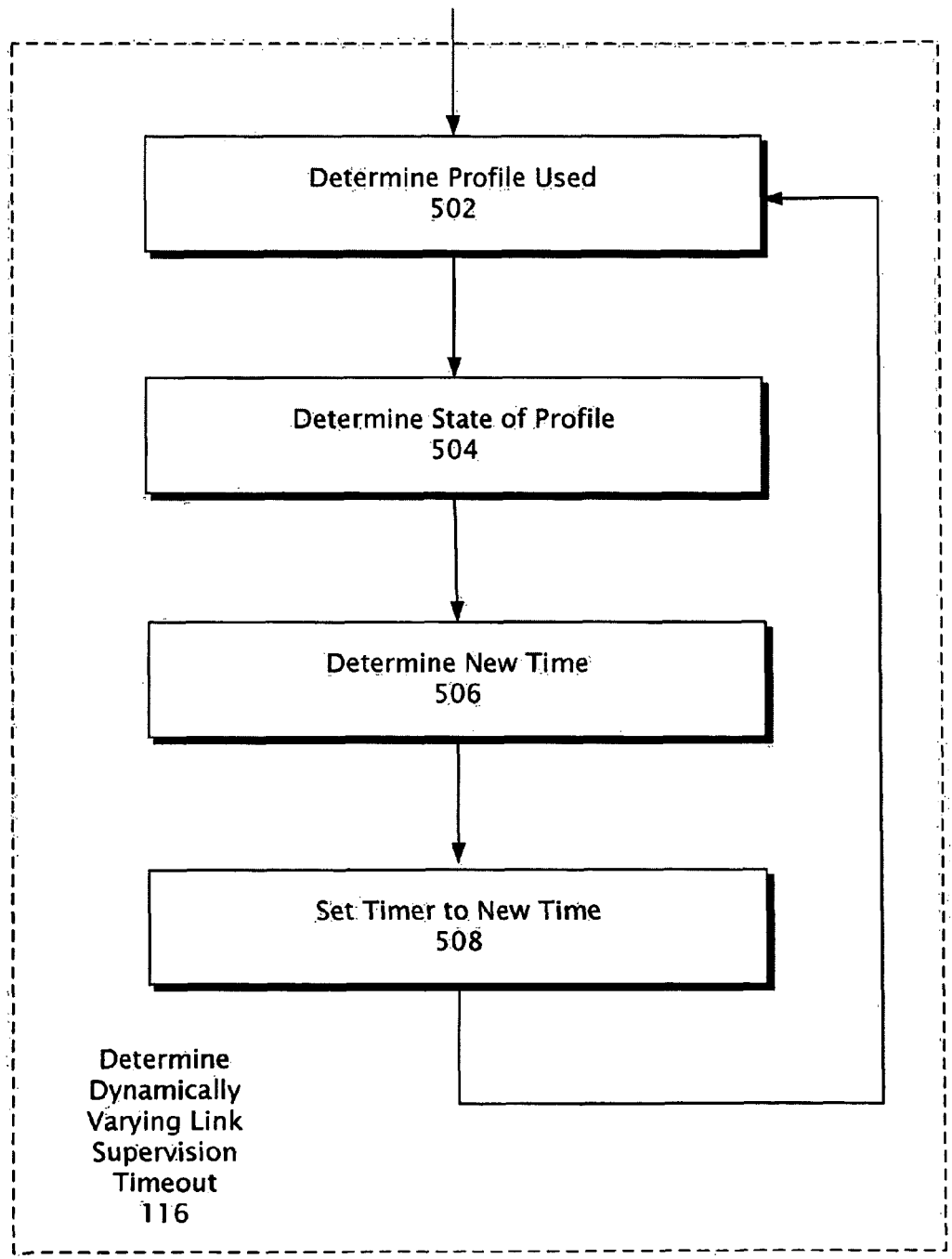
FIG. 5 is a process diagram for the determination of the timeout for the dynamically varying link supervision timer.

FIG. 5 is a process diagram for the determination of the timeout for the dynamically varying link supervision timer.

Dynamic configuration of the "Link Supervision Timer" taking into consideration the profile being used as well as the state profile is in may provide a better user experience. For the example of the Hands Free Profile by going through some of the states that the HF and the Audio Gateway ("AG") could be it may be possible to arrive at a modified value of the "Link Supervision Timer".

In determining the variation to be applied to the link supervision timer 202, the profile being used is first determined as shown in 502. Next, the state of the profile during the course of transmission is determined as shown in 504. From these states, the new timeout is determined as shown in 506, and the link supervision timer is set or modified to the new time as shown in 508. This may be easily accomplished as the timer is typically implemented in software and is easily reset by appropriate program instructions, once determined.

In the idle state the Phone and Car Kit may be connected but not in a call. In the idle state, the "Link Supervision Timer" could remain set to its default value, for example 20 seconds. In idle state there is typically not much adverse impact on user experience by the "Link Supervision Timer". Also having the link supervision timer set to a higher value can give more time for the HF and AG to recover and still retain the link. In the in call state the Phone and Car Kit may be connected with Phone in a call. In this state, the "Link Supervision Timer" value may be reduced to a substantially smaller value, say 2 seconds.

As shown in the previous figure the link supervision timer may be reduced somewhat drastically while using Hands Free profile, and also if there is a call. With this change in the link supervision timer, if there is an abrupt link loss the audio may be transferred to phone immediately.

The same technique of varying the link supervision timer can be applied in alternative examples. In the example of a PAN profile the link supervision timer can be changed depending on TCP re-transmissions. If there is congestion in the data link this may be compensated for and the link supervision timer can be increased to avoid disconnecting the link only because of interference. With this approach a Bluetooth link can be retained for a longer duration of time. In sensor applications the link supervision timer can be modified dynamically depending on the data criticality and expected interference.

Those skilled in the art will realize that the process sequences described above maybe equivalently performed in any order to achieve a desired result. Also, sub-processes may typically be omitted as desired without taking away from the overall functionality of the processes described above.

Those skilled in the art will also realize that by utilizing conventional techniques known to those skilled in the art that all, or a portion of the software instructions to modify a link supervision timer may be carried out by a dedicated circuit, such as a DSP, programmable logic array, or the like.

What is claimed is:

1. A device comprising:
   a radio frequency (RF) transceiver;
   a processor, operatively coupled to the RF transceiver, the processor configured to:
   execute a protocol stack for operation of the RF transceiver, the protocol stack having a predetermined RF link disconnection timeout setting;
   monitor the protocol stack for an operating device profile at an application layer of the protocol stack, the operating device profile defining communication parameters with a second device;
   determine a state of the operating device profile;
   adjust, dynamically, the RF link disconnection timeout setting of the protocol stack based on the operating device profile and the state of the operating device profile; and
   return an audio signal to a cellular telephone upon expiration of the RF link disconnection timeout.

2. The device of claim 1, in which operates according to a Bluetooth standard.

3. The device of claim 2, comprising:
   a Bluetooth profile as the operating device profile, wherein the processor is configured to adjust, dynamically, the predetermined RF link disconnection timeout setting without modifying the Bluetooth profile.

4. A cell phone comprising the device of claim 2.

5. A hands free system comprising the device of claim 2.

6. The device of claim 2, in which the link disconnection timeout setting is shortened when the operating device profile involves processing of an audio signal.

7. The device of claim 2, wherein the device is a master device.

8. The device of claim 7 further comprising:
   at least one slave device to form a piconet with the master device.

9. The device of claim 8, wherein the piconet is a personal area network ("PAN").

10. A method;
    executing a protocol stack for operation of a radio frequency (RF) transceiver, the protocol stack having a predetermined RF link disconnection timeout setting;
    monitoring the protocol stack for an operating device profile at an application layer of the protocol stack, the operating device profile defining communication parameters with a second device;
    determining a state of the operating device profile;
    adjusting, dynamically, the RF link disconnection timeout setting of the protocol stack based on the operating device profile and the state of the operating device profile; and
    returning an audio signal to a cellular telephone upon expiration of the RF link disconnection timeout.

11. The method of claim 10, wherein determining a state of the operating device profile, comprises:
    determining a state of a hands free device profile.

12. The method of claim 11, wherein determining the state of the operating device profile includes:
    determining that an audio link is present.

13. The method of claim 12, wherein adjusting, dynamically, the RF link disconnection timeout setting of the protocol stack based on the operating device profile and the state of the operating device profile, comprises:
    shortening the RF link disconnection timeout setting in response to an audio link being present.

14. The method of claim 11, wherein the RF link disconnection timeout setting is not adjusted if the state of the hands free device profile indicates that the audio signal is not present.

15. The method of claim 10, wherein determining a state of the operating device profile, comprises:
    determining a state of a PAN profile.

16. The method of claim 15, wherein adjusting, dynamically, the RF link disconnection timeout setting of the protocol stack based on the operating device profile and the state of the operating device profile, comprises:
    increasing the RF link disconnection timeout setting in response to detecting that a network link is running slower than a nominal value.

* * * * *